Patented Feb. 5, 1929.

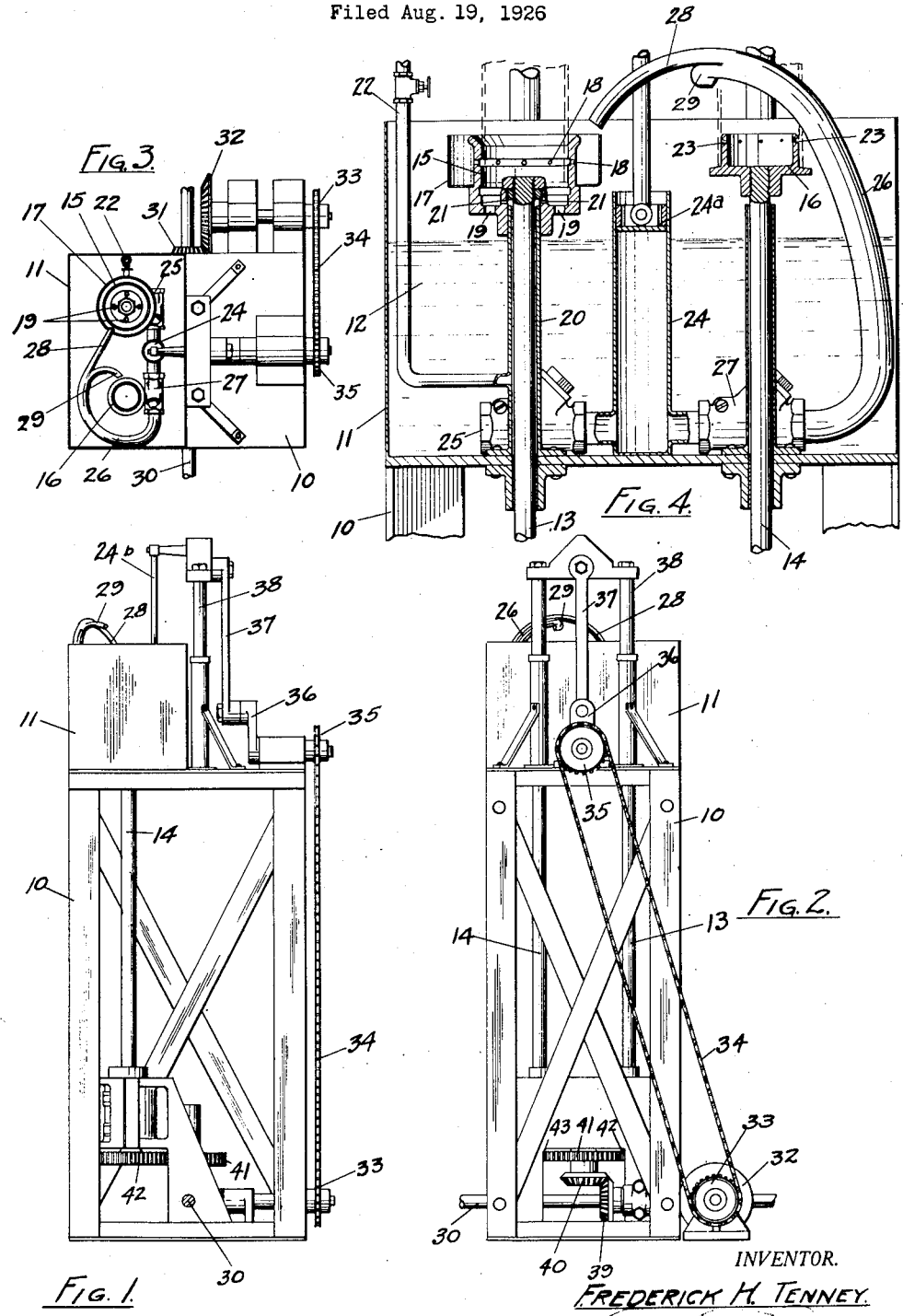

1,701,457

UNITED STATES PATENT OFFICE.

FREDERICK H. TENNEY, OF AKRON, OHIO, ASSIGNOR TO THE FIRESTONE TIRE AND RUBBER COMPANY, OF AKRON, OHIO, A CORPORATION OF OHIO.

APPARATUS FOR CEMENTING THE ENDS OF INNER TUBES IN PREPARATION FOR SPLICING.

Application filed August 19, 1926. Serial No. 130,186.

This invention relates to apparatus for use in cementing the ends of inner tubes of rubber in preparation for splicing the ends together.

In the manufacture of inner tubes, rubber is formed into a tube on either straight or curved mandrels and the tubes are vulcanized thereon. Subsequently they are stripped therefrom and the ends skived and cemented in preparation for the splicing operation by which one cemented end is inserted into the other and the spliced ends cured by either hot or cold vulcanization.

Heretofore the cementing operation has been performed by hand. Since in modern practice the various splicing operations are performed on the tubes while on a traveling conveyor, this hand cementing operation has necessitated a low speed conveyor and employment of several cementing operatives for each conveyor.

The present invention has for its general purpose the provision of apparatus for cementing the ends of inner tubes in preparation for splicing in a quick, efficient manner and by the use of which the other tube splicing operations are expedited.

The foregoing and other objects of the invention are obtained by the apparatus illustrated in the accompanying drawings and described below. It is understood that the invention is not limited to the specific form thereof illustrated and described.

Of the accompanying drawings,

Figure 1 is a side elevation of an apparatus embodying the invention;

Figure 2 is a rear elevation thereof;

Figure 3 is a plan thereof; and

Figure 4 is a detail section through the cement tank, pump and tube cementing instrumentalities.

Referring to the drawings, 10 represents a suitable supporting frame on which is mounted a tank 11 for providing a supply of rubber cement indicated at 12. Extending upwardly into tank 11 through the bottom thereof are shafts 13 and 14 which are arranged to project above the level of liquid 12. Shaft 13 has a cup 15 secured on its upper end and adapted to apply cement about the outer surface of one end of the tube. Shaft 14 has a cup 16 on its upper end adapted to apply cement about the inner surface of the opposite end of the tube.

Cup 15 is enclosed by a receptacle 17 and has apertures 18, 18 therein whereby cement may flow from receptacle 17 through cup 15 so as to flow as a film down the inner surface thereof, and also has apertures 19, 19 in the bottom thereof from which the cement can empty into tank 11. In order to hold the end of the tube against the wall of cup 15, an air pressure supply pipe 20 may be arranged about shaft 13 in tank 11 so as to connect the inside of the cup through apertures 21, 21 to a pressure supply line 22.

Cup 16 is arranged to receive cement directly therein and has apertures 23, 23 through its walls for conducting cement from the inside of the cup outwardly so as to flow downwardly as a film over the outer surface of the wall of the cup.

Supply of cement to receptacle 17 and cup 16 is preferably accomplished by means of a pump 24 arranged in tank 11 and adapted to draw cement from said tank through a check valve 25 and to deliver it to a conduit 26 through a check valve 27, conduit 26 having a branch 28 emptying into receptacle 17 and a branch 29 emptying into cup 16. Pump 24 preferably includes a single-action piston $24^a$ so that the discharge of cement into cup 16 will be intermittent.

Driving of pumps 24 and of shafts 13 and 14 may be effected by any suitable mechanism, a main drive shaft 30 being herein shown as provided with a drive pinion 31 meshed with a gear 32 arranged to drive the pump 24 through sprocket 33, chain 34, sprocket 35, crank 36 and pitman 37, which is connected to a slide 38 to which latter piston rod $24^b$ of pump 24 is connected. Drive shaft 30 is also provided with a driving pinion 39 meshed with a gear 40 which drives a gear 41 meshed with gears 42 and 43 respectively on shafts 13 and 14.

In using the apparatus, the cups 15 and 16 are continuously driven and pump 24 intermittently delivers streams of cement to receptacle 17 and cup 16, whereby a film of cement runs down the inner wall of cup 15 and the outer wall of cup 16. Air under pressure is continuously delivered to the interior of cup 15.

An operative seizes one end of each tube as they pass on a conveyor (not shown) and inserts it in cup 15, the air therein blowing it out into contact with the inner wall of the cup whereby the outside of the tube is coated with cement adjacent its end. This tube end is held in the cup only an instant and is then withdrawn. The operative, or in some cases, another operative then seizes the other end of the tube on the conveyor and, timing his operation with that of the pump, places it about the wall of cup 16 during the non-pumping stroke of the piston so that cement from branch 29 will not be sprayed onto the outside of the tube. It will be noted in this relation that the branch 29 of pipe 27 does not project over cup 16, but is so placed as to direct its stream therein from beyond the edge thereof so that mounting of the tube about the cup will not be interfered with. By this operation the inside of the other end of the tube is coated with cement. Accordingly, after the usual drying process, the first end can be inserted in the second end to make the splice.

The rotating cups 15 and 16, in addition to supplying the film of cement, act as spreaders to apply an even coating of cement on the ends of the tubes in a very short time. They greatly speed up the end-cementing operation and at the same time accomplish it better than by hand with fewer operatives.

Modifications of the invention may be resorted to without departing from the spirit thereof or the scope of the appended claims.

What is claimed is:

1. Apparatus for coating ends of tubes in preparation for a splicing operation, said apparatus including a tank for providing a supply of cement, cups rotatable above the tank, one of said cups being surrounded by a receptacle for cement and having apertures therein through which cement can flow from the receptacle down the inside of the wall of the cup, and having apertures through its bottom through which cement may empty into said tank, means for supplying air under pressure into said cup to blow the tube against the wall thereof, the other cup having apertures therein through which cement may flow from the other cup down the outside of its wall, a single acting pump arranged in the tank to pump cement therefrom, a conduit leading from the delivery side of the pump and having branches for delivering cement respectively to the receptacle and the second, cup and means for rotating the cups and operating the pump.

2. Apparatus for coating ends of tubes in preparation for a splicing operation, said apparatus including a tank for providing a supply of cement, cups rotatable above the tank, one of said cups being surrounded by a receptacle for cement and having apertures therein through which cement can flow from the receptacle down the inside of the wall of the cup, and having apertures through its bottom through which cement may empty into said tank, the other cup having apertures therein through which cement may flow from the other cup down the outside of its wall, a single acting pump arranged in the tank to pump cement therefrom, a conduit leading from the delivery side of the pump and having branches for delivering cement respectively to the receptacle and the second cup, and means for rotating the cups and operating the pump.

3. Apparatus for coating ends of tubes in preparation for a splicing operation, said apparatus including a tank for providing a supply of cement, cups rotatable above the tank, one of said cups being surrounded by a receptacle for cement and having apertures therein through which cement can flow from the receptacle down the inside of the wall of the cup, and having apertures through its bottom through which cement may empty into said tank, means for supplying air under pressure into said cup to blow the tube against the wall thereof, the other cup having apertures therein through which cement may flow from the other cup down the outside of its wall, a single acting pump arranged in the tank to pump cement therefrom, and a conduit leading from the delivery side of the pump and having branches for delivering cement respectively to the receptacle and the second cup.

4. Apparatus for coating ends of tubes in preparation for a splicing operation, said apparatus including a tank for providing a supply of cement, cups rotatable above the tank, one of said cups being surrounded by a receptacle for cement and having apertures therein through which cement can flow from the receptacle down the inside of the wall of the cup, and having apertures through its bottom through which cement may empty into said tank, the other cup having apertures therein through which cement may flow from the other cup down the outside of its wall, a single acting pump arranged in the tank to pump cement therefrom, and a conduit leading from the delivery of the pump and having branches for delivering cement respectively to the receptacle and the second cup.

5. Apparatus for coating ends of tubes in preparation for a splicing operation, said apparatus including a tank for providing a supply of cement, cups rotatable above the tank, one of said cups being surrounded by a receptacle for cement, from which cement may flow down the inside of the wall of said cup, means for supplying air under pressure into said cup to blow the tube against the wall thereof, the other cup being adapted to deliver a film of cement to the outside of its wall, a single acting pump arranged in the tank to pump cement therefrom, and a conduit leading from the delivery side of the pump and having branches for delivering cement respectively to the receptacle and the second cup.

6. Apparatus for coating ends of tubes in preparation for a splicing operation, said apparatus including a tank for providing a supply of cement, cups rotatable above the tank, one of said cups being surrounded by a receptacle for cement, from which cement may flow down the inside of the wall of said cup, the other cup being adapted to deliver a film of cement to the outside of its wall, a single acting pump arranged in the tank to pump cement therefrom, and a conduit leading from the delivery side of the pump and having branches for delivering cement respectively to the receptacle and the second cup.

7. Apparatus for cementing the end of a tube in preparation for a splicing operation, comprising a tank for containing a supply of cement, a cup rotatable above the tank and surrounded by a receptacle from which a film of cement may flow down the inside of the cup wall, a pump in the tank arranged to deliver cement therefrom to said receptacle, and means for supplying air under pressure to the cup.

8. Apparatus for cementing the end of a tube in preparation for a splicing operation, comprising a tank for containing a supply of cement, a cup rotatable above the tank and surrounded by a receptacle from which a film of cement may flow down the inside of the cup wall, and a pump in the tank arranged to deliver cement therefrom to said receptacle.

9. Apparatus for cementing the end of a tube in preparation for a splicing operation, said apparatus including a rotatable, hollow, cylindrical member, means for supplying a film of cement to the inside of the wall of said member, and means for supplying air under pressure to the inside of the member.

10. Apparatus for cementing the outer surface of the end of a tube in preparation for a splicing operation, said apparatus including a rotatable, hollow, cylindrical member, arranged to receive an inner tube therein, and means for supplying a film of cement to the inside of the wall of said member.

11. Apparatus for cementing the end of a tube in preparation for a splicing operation, said apparatus including a tank for containing a supply of cement, a cup rotatable above the tank, a pump for intermittently delivering cement from the tank into the cup, the cup being constructed so that the cement will flow as a film down the outer surface thereof, and means connected to the delivery side of the pump for directing the cement into the cup from a point in unobstructing relation thereto.

12. Apparatus for cementing the end of a tube in preparation for a splicing operation, said apparatus including a tank for containing a supply of cement, a cup rotatable above the tank, and a pump for intermittently delivering cement from the tank into the cup, the cup being constructed so that the cement will flow as a film down the outer surface thereof.

FREDERICK H. TENNEY.